United States Patent Office 3,662,020
Patented May 9, 1972

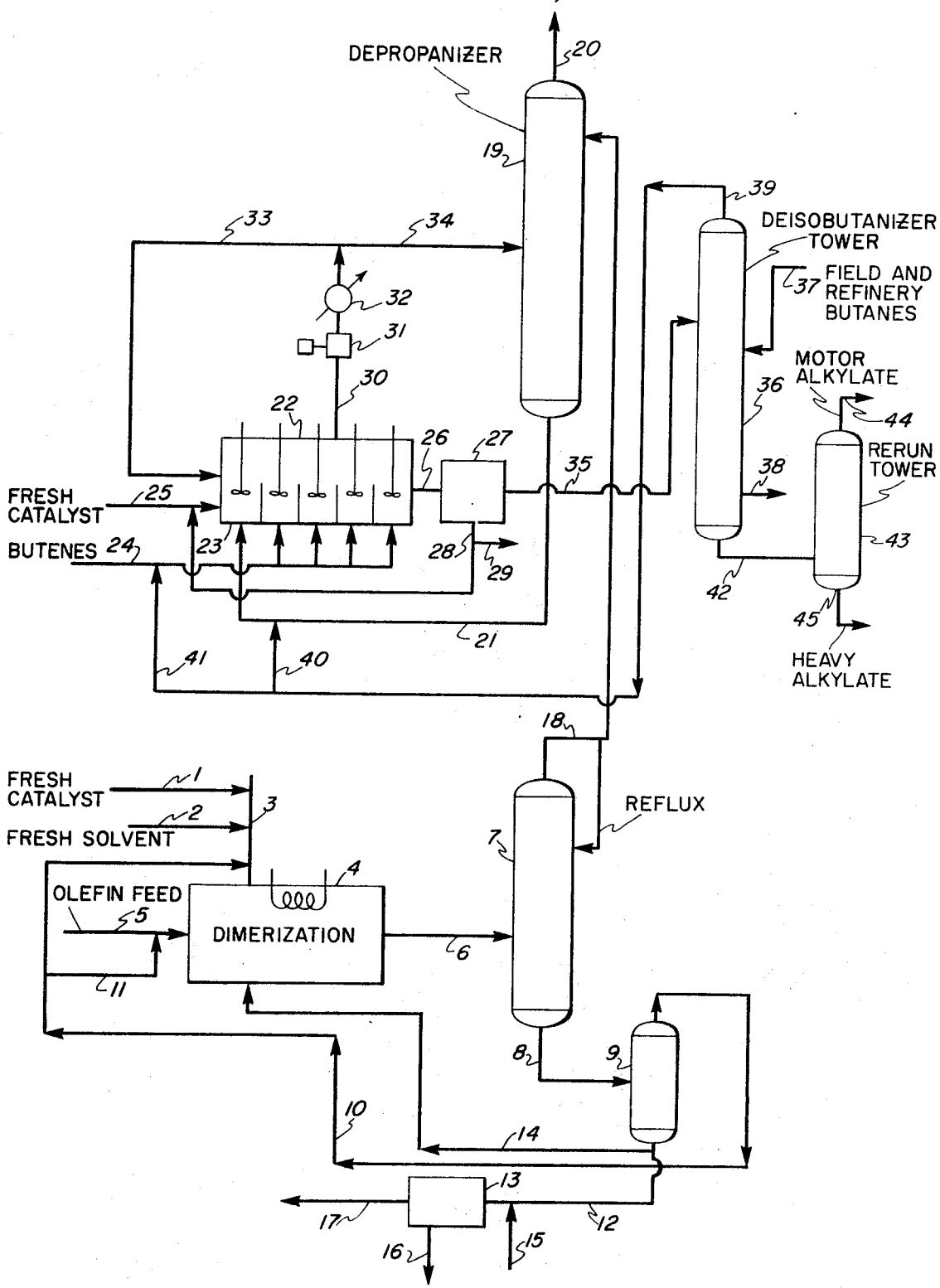

3,662,020
PROCESS FOR THE DIMERIZATION OF PROPYLENE AND ALKYLATION OF THE DIMER
Charles E. Hemminger, P.O. Box 103, Peapack, N.J. 07877, and Ivan Mayer, 145 Hillcrest Ave., Summit, N.J. 07901
Filed Feb. 9, 1970, Ser. No. 9,882
Int. Cl. C10c 3/10, 3/52, 3/54
U.S. Cl. 260—683.43                                    10 Claims

ABSTRACT OF THE DISCLOSURE

An integrated process prepares alkylated aliphatic hydrocarbons with (1) dimerization of a propylene-containing feed to produce a product containing a major amount of dimethylbutenes and (2) alkylation of the dimerization product with a $C_3$–$C_5$ olefin and isobutane to recover a product containing dimethylbutanes, isooctane and alkylate. The dimerization reaction is carried out with a specific catalyst complex while the alkylation catalyst may be either $H_2SO_4$, HF or crystalline aluminosilicate zeolites.

Propylene has been alkylated with isobutane in alkylation plants; however, the process produces generally inferior alkylate with a Clear Motor Octane number of about 89, and catalyst consumption is high. This invention is concerned with dimerizing the propylene in $C_3$ streams for the purpose of making them available for alkylation and for producing a high quality alkylate product and providing a lower cost alkylation plant.

Propylene is readily available at low cost and a process has been developed recently for converting propylene into a $C_6$ olefin product containing major amounts of dimethylbutenes, i.e., 2,3-dimethylbutene-1 and 2,3-dimethylbutene-2. When the dimethylbutenes are admixed with an isoparaffin in the presence of an acid alkylation catalyst, the dimethylbutenes are almost completely saturated to dimethylbutanes having a Clear Motor Octane Number of 94–95 and a Clear Research Octane Number on the order of 103–104. At the same time, so-called self-alkylation takes place. The hydrogen moves from the isoparaffin present to saturate the dimethylbutenes and produces an isoolefin. Assuming the isoparaffin is isobutane, the isoolefin produced is isobutylene. Isobutylene then alkylates with isobutane to give an alkylate of higher than 94 Clear Motor Octane Number.

An outstanding advantage of the integrated two-step process is that the propylene containing fraction fed to the dimerization step need not be free of $C_2$ components. Thus, propylene frequently lost in separating the $C_2$–$C_3$ fractions is available for alkylation. Also, the ethylene present in the $C_3$ fraction is polymerized to butenes and can be recovered as such from the dimerization process. Another advantage is that propylene in dilute streams, say less than 10% propylene, can be economically alkylated. This is because propylene is effectively separated from other light hydrocarbons such as propane in the dimerization step and subsequent fractionation steps.

The invention will be more fully described below in conjunction with the drawing, which is a diagrammatic flow sheet of the overall process. The process includes two reaction steps, dimerization and alkylation. U.S. Pat. No. 3,390,201 discloses a process for dimerizing propylene in the presence of a catalyst comprising a metal acetylacetonate, an alkyl aluminum halide and phosphine. The patent is hereby incorporated by reference in this disclosure.

Generally speaking, the dimerization step involves preparing the catalyst mixture or complex, passing a propylene containing gas into contact with the catalyst at reaction conditions and recovering the desired products. Any suitable reactor can be used for the reaction and no special contacting or handling equipment is required. The propylene containing gas can contain from 3 to 100 volume percent propylene, preferably 30 to 50 volume percent propylene. Reaction temperatures of −60° to 100° F. are suitable and a temperature range of 20° to 100° F. is preferred. Pressure can range from 0 to 500 p.s.i.g. and a range of 0 to 100 p.s.i.g. is preferred. Propylene rates of up to 11 kg. $C_3H_6$ per hour per gram of metal in the catalyst are suitable. The reaction is carried out continuously or batchwise as desired. A solvent medium is used and inert organic poler solvents are preferred. Suitable solvents include aliphatic and aromatic hydrocarbons and halogenated aliphatic and aromatic hydrocarbons containing 5 to 12 carbon atoms per molecule. Specific examples include oluene xylenes, ethyl benzene chlorobenzene, bromobenzene, chlorotoluene, methylene chloride, pentane, hexane, heptane, etc.

The first catalyst forming component is metallo acetylacetonate, selected from the group consisting of nickel acetylacetonate, iron acetylacetonate, and cobalt acetylacetonate. This component is present in the catalyst mixture in an amount of 5 to 40 weight percent based on the total catalyst.

The second catalyst component is an alkyl aluminum halide having the general formula $AlR_nX_{3-n}$, where $n$ has a value of from 1 to 2. Particularly suitable materials include $Et_2AlCl$, $EtAlCl_2$, and mixtures of these as well as bromine substituted halides, e.g., $Et_2AlBr$ and $EtAlBr_2$. The alkyl group can contain from 1 to 6 carbon atoms. This component is present in the catalyst mixture in an amount of 38 to 85 weight percent based on the total catalyst.

The third catalyst component is a phosphine having the general formula $R_3P$, wherein R is selected from the group consisting of alkyl radicals having up to 10 carbon atoms and cycloalkyl radicals having up to 10 carbon atoms. This component is present in the catalyst mixture in an amount of 5 to 40 weight percent based on total catalyst.

Example I and Tables I and II of U.S. Pat. No. 3,390,201 disclose various aspects of the dimerization step and the dimethylbutene dimerization products, particularly 2,3-dimethylbutene-1 and 2,3-dimethylbutene-2. The data show that the dimerization can be carried out selectively to provide at least 50% dimethylbutenes in the reaction product.

Referring to the drawing, fresh catalyst ingredients and fresh solvent are fed by lines 1, 2, and 3 to dimerization reactor 4. The metallo acetylacetonate component is present in an amount ranging from 5 to 40 weight percent; the alkyl aluminum halide component is present in an amount ranging from 38 to 85 weight percent and the phosphine component is present in an amount ranging from 5 to 40 weight percent. The aforementioned quantities are based on the total catalyst. The catalyst complex can be made in situ or it can be prepared outside the reactor in a suitable catalyst preparation unit.

The solvent can be used as the catalyst preparation medium as well as the reaction meduim.

Olefinic gas containing 3 to 100 volume percent, preferably 30 to 50 volume percent, propylene is fed to the dimerization reactor by line 5. The gas can contain such impurities as ethane, ethylene and propane since ethylene is converted to $C_4$ olefins and ethane and propane are easily separated in a later step of the process. The dimerization reaction is preferably carried out in the liquid phase at a temperature in the range of $-60°$ to $100°$ F., preferably $80°$ to $100°$ F., and a pressure in the range of 0 to 200 p.s.i.g. Propylene rates of up to 11 kg. $C_3H_6$ per hour per gram of metal in the catalyst in the reactor are suitable. A reaction effluent comprising olefins containing six carbon atoms and predominantly dimethylbutenes is recovered from reactor 4 and passed via line 6 to fractionator 7. From the fractionator, solvent, catalyst complex and the majority of the olefin polymers containing 7 or more carbon atoms are removed by line 8 and these materials are passed to fractionation tower 9. Solvent is recovered overhead from tower 9.

To obtain a process that is more selective to dimethylbutenes, an excess of solvent over that required for the catalyst is provided for the dimerization step. Catalyst-free solvent is recycled by line 10 and part of the solvent is passed via line 11 into line 5, where it serves to dilute the olefin feed to the extent that the concentration of the olefin in the solvent-olefin mixture is about 5 volume percent or less. Heavy olefin polymers and spent catalyst are passed by line 12 to catalyst removal zone 13; however, a portion of this material is recycled to the dimerization reactor by line 14. Water is added via line 15 to promote separation of the catalyst from the polymer. Catalyst and water are removed from the catalyst removal zone by line 16, and heavy polymer is passed to storage by line 17.

Fractionation tower 7 is operated at a bottom temperature close to the boiling point of the solvent at tower pressure.

The $C_6$ dimethylbutene fraction as well as lighter $C_2$–$C_5$ olefin hydrocarbons are recovered overhead from fractionator 7 by line 18. This fraction contains predominantly 2,3-dimethylbutene-1, 2,3-dimethylbutene-2 and other $C_6$ olefins. Depending on the composition of the dimerization feedstock, the fraction may also contain butane, propane and ethane carried overhead with the lighter materials recovered from fractionator 7. Material in line 18 passes into fractionator 19 for purging of $C_2$ and $C_3$ hydrocarbons by line 20. The $C_6$ olefin fraction to be saturated by hydrogen transfer is passed by line 21 into alkylation reactor 22 at a point where the isobutane concentration is high. An ideal location is one of the early stages of the reaction shown generally by reference numeral 23. The source of the isobutane will be discussed subsequently in this disclosure. $C_3$–$C_5$ olefins such as butenes and other olefins, e.g., propylene and pentylenes, for use in the conventional alkylation reaction with isobutane are added to the alkylation reactor by line 24 into the downstream portion of the reactor at lower levels of isobutene concentration. Fresh alkylation catalyst is provided by line 25. Suitable catalysts include sulfuric acid, hydrogen fluoride, and a slurry of crystalline aluminosilicate zeolites such as faujasites and mordenites exchanged with metals, ammonia and/or hydrogen. A preferred fresh catalyst is sulfuric acid having an initial concentration of 96 to 100 weight percent titratable $H_2SO_4$, preferably 97.5 to 99.5% $H_2SO_4$. The acid is considered spent when the concentration drops to about 88 to 95 weight percent. Fresh catalyst is added at a rate to maintain the aforementioned strength. The addition rate may range from 0.5 to 1.5 pounds of catalyst per gallon of olefin. The net fresh isobutane rate for self-alkylation is slightly greater than two moles per mole of olefin, and the net fresh isobutane rate for butene alkylation is slightly greater than one mole per mole of olefin.

The reactions which take place in the reactor are:

(1) Self-alkylation of dimethylbutenes (a) saturation of dimethylbutenes $$iC_6H_{12} + iC_4H_{10} \rightarrow iC_6H_{14} + iC_4H_8$$

(b) alkylation of resulting isobutylene $$iC_4H_8 + iC_4H_{10} \rightarrow iC_8H_{18}$$

(2) Conventional alkylation $$C_4H_8 + iC_4H_{10} \rightarrow iC_8H_{18}$$

(3) Other type reactions $$iC_6H_{12} + iC_4H_{10} \rightarrow iC_{10}H_{22}$$

$$2C_6H_{12} \rightarrow C_{12}H_{24}$$

$$C_{12}H_{24} + iC_4H_{10} \rightarrow C_{16}H_{34}$$

$$C_{12}H_{24} + iC_4H_{10} \rightarrow C_{12}H_{26} + iC_4H_8$$

The simultaneous hydrogenation of almost pure 2,3-dimethylbutenes and conversion of isobutane to isooctane is due to the ability of concentrated sulfuric acid to abstract protons from isobutane. These are then transferred to the dimethylbutene to form dimethylbutane. The isobutene resulting from the proton abstraction is then alkylated with isobutane to form isooctane. The preferential reaction of isobutane with the monoolefin, isobutene, rather than with the higher molecular weight monoolefin 2,3-dimethylbutene, is not fully understood, and to a large degree, an unexpected result.

It may be emphasized that the production of the doubly branched propylene dimer, 2,3-dimethylbutene, rather than the singly branched dimer, methylpentene, as a feed to an alkylation unit is advantageous because the former gives a hydrogenated product of 94 Clear F–2 Octane Number as compared to a hydrogenated product of 74 Clear F–2 Octane Number in addition to the isooctanes from self-alkylation of isobutane of 95 Octane Number or better. Another gain in converting propylene to doubly branched monoolefins before alkylation is that the resulting 2,3-dimethylbutane from the olefin boils at $136°$ F. and isoheptane from conventional propylene alkylation boils at about $175°$ F. The lower boiling point product is desirable in balancing the volatility requirements of finished gasolines.

Alkylation reaction effluent is passed by line 26 to settler 27, acid is withdrawn from the bottom of the settler for recycle by lines 28 and 25. Spent acid is removed from the system by line 29 for disposal and purification.

Since the alkylation reaction is exothermic, it is necessary to remove heat of reaction to maintain the temperature within the range from about $20°$ to about $100°$ F., preferably $35°$ to $55°$ F. To this end, line 30 leads from reactor 22 to a compresser 31, which causes evaporation of part of the contents of reactor 22 and permits cooling of the contents by autorefrigeration. The compresser 31 discharges into a cooler 32 to remove heat from the vapors and liquefy them. A portion of the liquid is recycled to the reactor via line 33 and the remainder of the liquid is passed via line 34 to fractionator 19. The liquid comprises a major proportion of isobutane and n-butane and a minor proportion of propane.

The alkylation effluent which settles into the upper portion of the emulsion settler 27 is withdrawn by line 35 for transfer to fractionator 36. This fractionator performs two functions, i.e., separation of the alkylate product from isobutane and separation of isobutane from butane. Field butanes comprising isobutane and n-butanes are fed to the fractionator by line 37. N-butane is removed as a side cut by line 38. The isobutane is passed to the alkylation reactor by lines 39, 40, 41 and 24. Alkylate product comprising a $C_5$ to $C_{12+}$ paraffinic hydrocarbon fraction is passed by line 42 to rerun tower 43. Light alkylate comprising $C_5$ to $C_{10-12}$ hydrocarbons and having an end point in the range of 320° to 400° F. is removed overhead by line 44. Heavy alkylate comprising $C_{10-12+}$ hydrocarbons and having an initial boiling point in the range of 330° to 390° F. and an end point in the range of 500° to 700° F. is removed from the alkylate rerun tower by line 45.

The process of the invention provides a means of making high quality alkylate from a propylene base stock. Dimethylbutenes are prepared in the dimerization step and they are saturated by hydrogen from isobutane to form high octane dimethylbutanes in the alkylation reactor. Concurrently the resulting isobutylene alkylates with isobutane in the alkylation zone to provide alkylate with a Motor Octane Number of over 94. In addition, conventional alkylation of n-butenes and isobutenes with isobutane is preferably carried out simultaneously in the same reaction zone.

Since one of the double bonds of two propylene molecules is destroyed in the dimerization and its heat of reaction is removed in this process step by conventional cooling means, i.e., indirect heat transfer to cooling water, there is a substantial reduction in the refrigeration required to alkylate the same weight of propylene in the dimer form as compared to the monomer form.

Additional advantages of the invention are:

(a) Elimination of propane from the alkylation reactor when processing a $C_3$ stream containing substantial quantities of propane. The latter is rejected from the alkylate feed in depropanizing the dimer. This means the alkylation plant can be built for somewhat lower pressures and there is less dilution of reactants in the reactor, resulting in lowering of isobutane concentration in recycle;

(b) Where propylene content of the $C_3$ stream is less than 50 percent, a superfractionation, to raise propylene concentration to 60 to 90 percent, is eliminated;

(c) The product from alkylation of the dimer has a wider boiling range since the principal products are $C_6$ and $C_8$ hydrocarbons rather than $C_7$ hydrocarbons when alkylating propylene ($C_3H_6 + iC_4H_{10} \rightarrow iC_7H_{16}$). This characteristic is valuable in giving volatility to gasoline blends;

(d) The octane of the dimer alkylate product is in the range of 93–94 F-2 clear as compared to about 89–91 F-2 clear from propylene alkylation; and (e) The acid consumption in the alkylation is reduced in the dimer alkylation as compared to the propylene alkylation since ethylene can be economically fractionated out of the fresh feed.

What is claimed is:

1. An integrated process for the preparation of alkylated aliphatic hydrocarbons comprising the steps of:
   (a) reacting a propylene-containing gas in the presence of an inert organic solvent and a catalyst complex comprising (i) 5 to 40 weight percent of an organometallic component selected from the group consisting of nickel acetylacetonate, iron acetylacetonate and cobalt acetylacetonate, (ii) 35 to 85 weight percent of an alkyl aluminum halide having the general formula $AlR_nX_{3-n}$ wherein R is an alkyl group containing 1 to 6 carbon atoms, X is a halogen and $n$ has a value of from 1 to 2, and (iii) 5 to 40 weight percent of a phosphine having the general formula $R_3P$ wherein R is selected from the group consisting of alkyl radicals having up to 10 carbon atoms and cycloalkyl radicals having up to 10 carbon atoms;
   (b) recovering a reaction product containing a major amount of dimethylbutenes;
   (c) contacting said reaction product and a $C_3$–$C_5$ olefin with isobutane at alkylation conditions in the presence of an alkylation catalyst selected from the group consisting of sulfuric acid and crystalline zeolite molecular sieves whereby dimethylbutanes, isooctane and $C_3$–$C_5$ olefin-isobutane alkylate are formed; and
   (d) recovering a branched chain paraffin hydrocarbon alkylation product containing said dimethyl butanes, isooctane and $C_3$–$C_5$ olefin-isobutane alkylate.

2. Process according to claim 1 which the propylene containing gas contains less than 50 percent propylene.

3. Process according to claim 1 in which the alkylation catalyst is $H_2SO_4$.

4. Process according to claim 1 in which the organometallic component is nickel acetylacetonate.

5. Process according to claim 1 in which the olefin feed to dimerization step (a) is diluted with excess solvent to produce a combined feed stream containing no more than about 5 percent olefins.

6. An integrated process for the preparation of alkylated aliphatic hydrocarbons comprising the steps of:
   (a) reacting a propylene-containing gas in the presence of an inert organic solvent and a catalyst complex comprising (i) 5 to 40 weight percent of an organometallic component selected from the group consisting of nickel acetylacetonate, iron acetylacetonate and cobalt acetylacetonate, (ii) 35 to 85 weight percent of an alkyl aluminum halide having the general formula $AlR_nX_{3-n}$ wherein R is an alkyl group containing 1 to 6 carbon atoms, X is a halogen and $n$ has a value of from 1 to 2, and (iii) 5 to 40 weight percent of a phosphine having the geneneral formula $R_3P$ wherein R is selected from the group consisting of alkyl radicals having up to 10 carbon atoms and cycloalkyl radicals having up to 10 carbon atoms;
   (b) recovering a dimerization product containing a major amount of dimethylbutenes;
   (c) contacting said dimerization product and a $C_3$–$C_5$ olefin with isobutane at alkylation conditions in the presence of a sulfuric acid alkylation catalyst whereby dimethylbutanes are formed in part by hydrogenation, isooctane is formed in part by self-alkylation of isobutane and $C_3$–$C_5$ olefin is alkylated with isobutane; and
   (d) recovering a branched chain paraffin hydrocarbon alkylation product containing said dimethylbutanes, isooctane and $C_3$–$C_5$ olefin/isobutane alkylate.

7. Process according to claim 6 in which the catalyst components of step (a) are (i) nickel acetylacetonate, (ii) ethyl aluminum dichloride, and (iii) tricyclohexylphosphine.

8. Process according to claim 6 in which the dimerization step (a) is carried out in the range of 70° to 100° F.

9. Process according to claim 6 in which the alkylation step for the dimer product is operated at temperatures between 35° to 50° F., olefin space velocity between 0.05 and 0.15, the titratable spent acid strength is between 93 and 96 weight percent, and the isobutane concentration in the hydrocarbon phase is greater than 75 volume percent.

10. An integrated process for the preparation of alkylated aliphatic hydrocarbons comprising the steps of:
   (a) reacting a propylene-containing gas in the presence of an inert organic solvent and a catalyst complex comprising (i) 5 to 40 weight percent of an organometallic component selected from the group consisting of nickel acetylacetonate, iron acetylacetonate and cobalt acetylacetonate. (ii) 35 to 85 weight percent of an alkyl aluminum halide having the general formula $AlR_nX_{3-n}$ wherein R is an alkyl group containing 1 to 6 carbon atoms, X is a halogen and $n$ has a value of from 1 to 2, and (iii) 5 to 40 weight percent of a phosphine having the general formula $R_3P$ wherein R is selected from the group consisting of alkyl radicals having up to 10 carbon atoms and cycloalkyl radicals having up to 10 carbon atoms;

(b) recovering a reaction product containing a major amount of dimethylbutenes;
(c) contacting said reaction product and a $C_3$–$C_5$ olefin with isobutane at alkylation conditions in the presence of an alkylation catalyst selected from the group consisting of $H_2SO_4$, HF and crystalline zeolite molecular sieves whereby dimethylbutanes are formed in part by hydrogenation, isooctane is formed in part by self-alkylation of isobutane and $C_3$–$C_5$ olefin is alkylated with isobutane; and
(d) recovering a branched-chain paraffin hydrocarbon alkylation product containing said dimethylbutanes, isooctane and $C_3$–$C_5$ olefin/isobutane alkylate.

References Cited

UNITED STATES PATENTS

| | | | |
|---|---|---|---|
| 2,336,005 | 12/1943 | Frey | 260—683.49 |
| 3,390,201 | 6/1968 | Drew | 260—683.15 D |
| 2,373,101 | 4/1945 | Clarke | 260—683.49 |
| 2,398,495 | 4/1946 | D'Ouville et al. | 260—683.62 |
| 2,439,021 | 4/1948 | Quigg | 260—683.49 |
| 2,906,795 | 9/1959 | Ballard et al. | 260—683.43 |

DELBERT E. GANTZ, Primary Examiner

G. J. CRASANAKIS, Assistant Examiner

U.S. Cl. X.R.

260—683.49, 683.61